United States Patent [19]

West et al.

[11] 4,401,888

[45] Aug. 30, 1983

[54] AUTOMATIC SENSING DEVICE FOR OFF-HORIZONTAL AND OFF-VERTICAL DETECTION

[75] Inventors: Richard D. West, Federal Way; Donald O. West, Lacey, both of Wash.

[73] Assignee: Quentron, Inc., Bellevue, Wash.

[21] Appl. No.: 318,013

[22] PCT Filed: Sep. 23, 1981

[86] PCT No.: PCT/US81/01281
§ 371 Date: Sep. 23, 1981
§ 102(e) Date: Sep. 23, 1981

[87] PCT Pub. No.: WO83/01137
PCT Pub. Date: Mar. 31, 1983

Related U.S. Application Data

[63] Continuation-in-part of Ser. No. 165,620, Jul. 3, 1980, abandoned.

[51] Int. Cl.³ ............................ G05D 1/08; B63B 1/22
[52] U.S. Cl. .................................. 250/231 R; 33/366; 114/126; 114/275; 318/640; 318/648; 364/434; 364/559

[58] Field of Search ............... 364/424, 434, 443, 559; 114/284–287, 275, 121, 122, 126; 250/231 R, 231 SE, 239; 33/366, 395, 313, 312, 302, 304, 306; 318/489, 584, 585, 580, 588, 640, 648; 244/3.21, 164, 171, 178; 340/686, 689; 356/138, 152

[56] References Cited

U.S. PATENT DOCUMENTS

| | | | |
|---|---|---|---|
| 3,156,209 | 11/1964 | Ask | 114/275 |
| 3,695,204 | 10/1972 | Bennett | 114/286 |
| 3,777,694 | 12/1973 | Best | 114/126 |

*Primary Examiner*—Joseph F. Ruggiero
*Attorney, Agent, or Firm*—David L. Garrison

[57] ABSTRACT

Automatic trim tab control system (10) for boats in which the controls are provided with an attitude sensing switch (14) which provides port/starboard, fore/aft correction signals to the system (10) for trim tab correction. A timing means (18) in the control system enables signals from the attitude sensing switch, if corrections are required, to be amplified (16) and then directed to the switching relays (20) for the trim tabs or other device requiring altitude correction. A digital embodiment (134) may also be used for applications other than boats.

12 Claims, 13 Drawing Figures

AUTOMATIC SENSING DEVICE FOR OFF-HORIZONTAL AND OFF-VERTICAL DETECTION

The instant application is a continuation-in-part of United States patent application Ser. No. 165,620, filed July 3, 1980 abandoned in the name of Richard D. West as inventor and entitled "Automatic Trim Tab Control System For Boats".

DESCRIPTION

1. Technical Field

The invention relates to the field of level sensing controls and more particularly relates to a sensor and controls for automatically sensing an off-level or off-vertical attitude and automatically signaling corrections.

2. Background Art

Boats, particularly vessels of small and medium size, are quite susceptible to roll and pitch when under way due to changes in course or speed, passenger loading or shifting, waves, currents, and winds. Those vessels which are equipped with trim tabs may require constant corrections to the position of the trim tabs in order to maintain the vessel in a desirable attitude. Accordingly, it is and has been a source of irritation and frustration to boat operators to be engaged in continual manual correction of the vessel's trim. In fact, continuous manual correction is impractical, especially when the vessel is constantly rolling either to port or starboard or the fore/aft plane needs to be corrected. Additionally, there are other applications for level sensing such as for example oil drilling platforms, under water cable-laying and bull-dozer and grader blade angles which require accurate indication of off-horizontal and/or off-vertical conditions for effective operation.

There is presently no known working unit on the market which automatically controls trim tab conditions. Among those systems which have made attempts at automatic control, some have failed because they would sense only one negative condition in the vessel's attitude at a time. Another short-coming has been that in the event of a severe planing and listing condition in the vessel at the same time, then there might be no correction whatsoever. On other units, if the trim tabs were correcting a bow plane attitude with both tabs full down, then there was no travel left in the tabs for correcting list. Certainly there has been no known system of preferential correction, as for example starboard-/port listing before fore/aft attitude correction. There has been an attempt at trim tab control with mercury switches but the reaction characteristics are almost totally random and therefore not predictable. There has been in the mercury switch approach no dampening or means by which to prevent over-reacting of the controls which in rough water could be nearly chaotic. The fact that prior art devices have been incapable of reading more than one negative attitude at a time, that is a starboard or port list or an off plane condition, that even if sensed, the unit would respond at random without giving priority to one correction first. An additional part of the problem has been that there is no specific control over the time period of correction or control over the response time to prevent overcorrection. There are also no known level sensing devices for applications other than boats in which an off-horizontal and/or off vertical attitude is sensed and correcting signals generated a response to the conditions detected.

Among the prior art devices which are known as U.S. Pat. Nos. 3,298,344; 3,695,204; and 3,777,694, none of which references are anticipatory of the instant invention.

DISCLOSURE OF INVENTION

Automatic control system for boat trim tabs which includes a sensor and switching mechanism which provides simultaneous list and planning signals for vessel attitude corrections. The sensor and signal generating system is also adaptable to other uses. Signals from the sensing and switching device are amplified and then directed to switching relays for the trim tabs. A sequencer circuit times the period for which a correction is made and allows only one dorrection at a time. If additional correction is needed, it will be sensed and the correction made during the next cycle of the timer circuit. By cycling the controls over compensation or correction is avoided. The signals from the sensor are enabled by the sequencer and, as permitted by the sequencer, are directed to relays for actuation of the appropriate trim tab. The system provides an override switch to eliminate bow, stern correction during severe water conditions when such a correction is not desired. The system provides for a priority down correction in the controls. A control panel is provided to indicate boat conditions and to further indicate what corrections are being made by the control system to the trim tabs.

Accordingly, it is among the many features and advantages of the invention to provide an automatic control system for trim tabs and other leveling uses which is simple, relatively inexpensive, reliable, accurate and sensitive. The sensor and switching unit is capable of reading any negative attitude in a full 360° circumference of the vessel at all times. The timing controls of each correction circuit allow a given period of time for trim tab correction followed by a timed reaction period for the vessel itself. This allows the vessel to correct before continuing trim tab movement to eliminate or at least minimize the probability of overcorrection. The sensor switch is designed so that part of it is submerged in heavy viscous fluid which acts as a dampener on the reaction time of the sensor and switch.

The relay bank for controlling the trim tabs is designed for priority movement of the trim tabs and will give down movement to all correction signals until maximum down travel has been achieved. After maximum down travel has been achieved, the controls automatically direct up movement signals to the opposite trim tabs to give maximum correction capability to the trim tabs. Down movement priority is given since a trim tab needs less movement down in order to achieve a desired correction. The priority down movement also assists in accelerating the vessel because of the tendency to bring the vessel to a plane condition more quickly. The system is easily installed on new or existing trim tabs. The system is designed in such a way that components are modular for easy and convenient replacement requiring a maximum of one-half hour to replace any portion or component of the unit. The system provides for a forward/aft override control in which the control panel includes switch so that under severe water conditions when planing correction is not feasible, this portion can be eliminated while maintaining port/starboard list correction capability.

The lighted control or mode panel indicator has two functions in that it can provide easy readout or indicia for the operator to show trim tab corrections in progress, that is the actual corrections being made and also the current vessel attitude. In short, the mode panel indicates to the operator what attitude the vessel is in or what correction is needed and also what is being done by the trim tab control system. Additionally, the model panel, with the help of a diagnosis sheet, can tell the operator where there is a failing part in the control system.

BEST MODE FOR CARRYING OUT THE INVENTION

Figure 1:
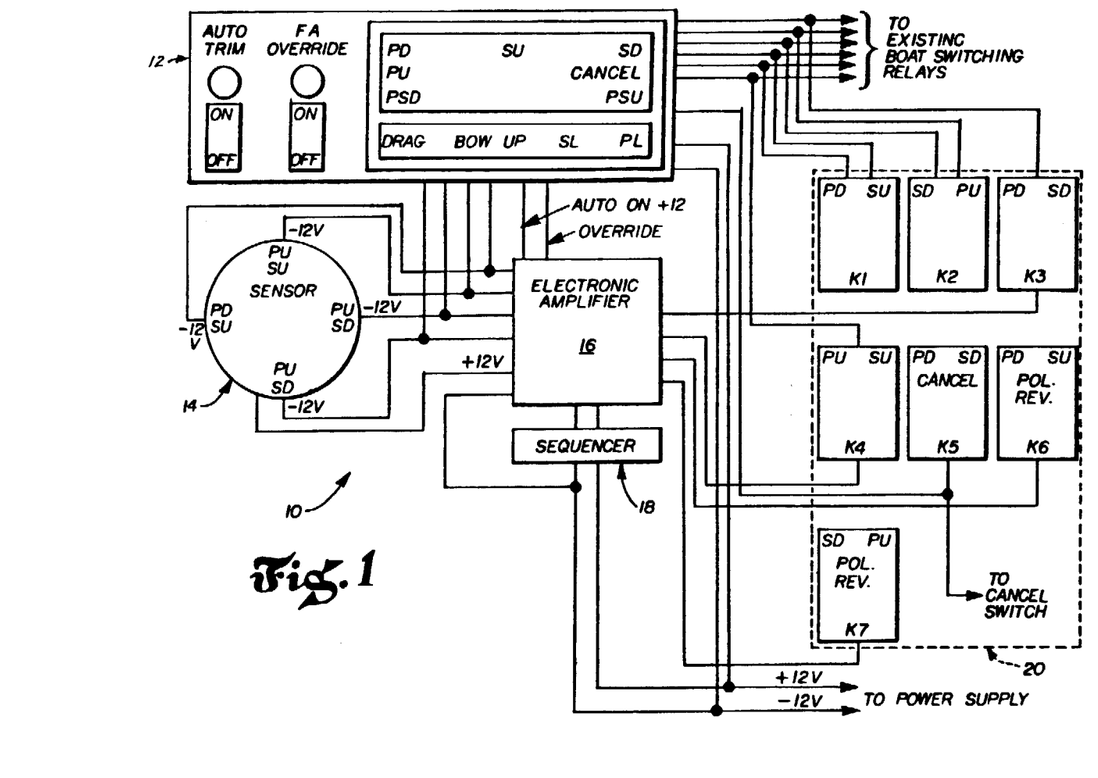
FIG. 1 is a component or major subcircuit block diagram showing the primary or principal subcircuit portions of the control system.

Referring now to the drawings, it will be seen in FIG. 1 that the control system, generally designated by the number 10, is provided with a mode or control readout panel generally designated by the number 12, a sensor switch mechanism generally designated by the number 14, an amplifier generally designated by the number 16, a sequencer designated by the number 18, and a relay bank for the trim tab control generally designated by the number 20.

The sensor switch 14 includes housing 22 having side and bottom walls and which can be described as a cylindrical type container of reasonably strong material such as plastic or metal if desired, and in various configurations though round is probably as convenient as any. Housing 22 in the lower half thereof has a support shelf or ledge 24 as can best be seen in FIG. 3. Ledge 24 receives a support plate 26 which includes radial slots 28 which are spaced at 90° intervals between the center and edge of plate 26. A balancing shaft 30 has an upper end 32 and a tapered lower end 34 with tip 35 which is received in a centrally disposed, upwardly facing cone or V-shaped socket or recess 36 provided on the upper surface of support plate 26.

Figure 3:
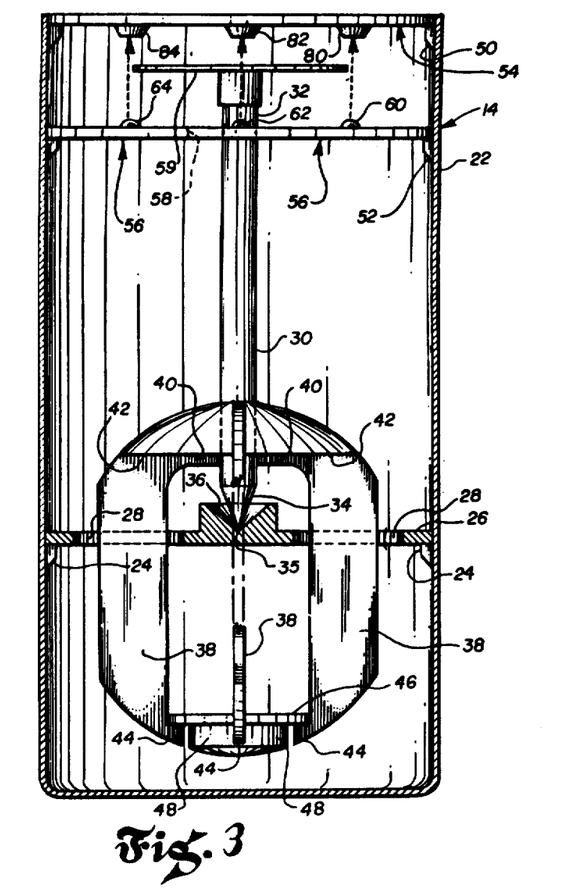
FIG. 3 is an elevational cross-section view of the attitude sensor switch showing details thereof.
Figure 4:
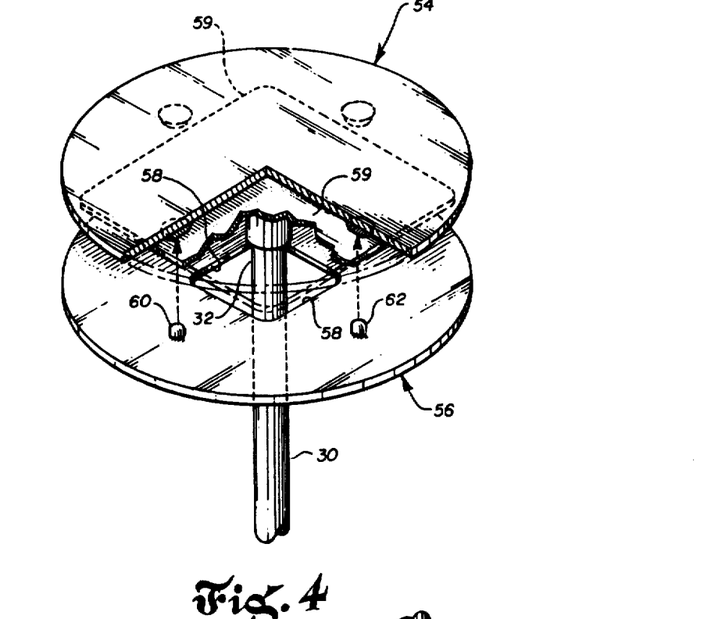
FIG. 4 shows the upper portion of the sensor/switch indicating additional details of construction particularly with respect to the circuit boards.
Figure 5:
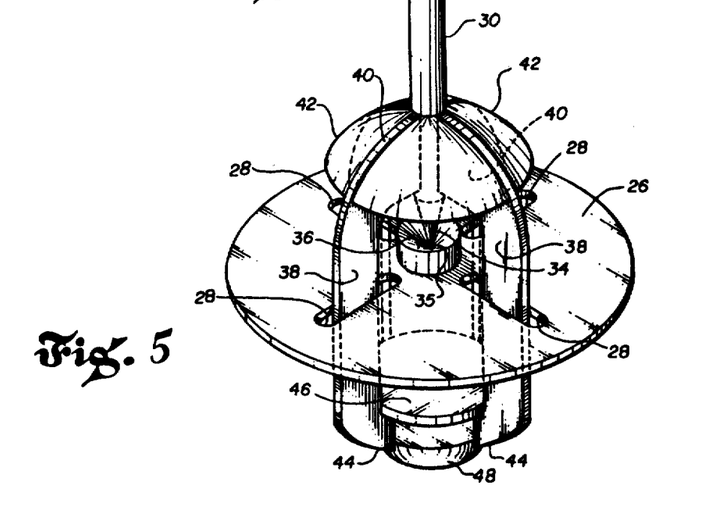
FIG. 5 is a partial perspective view of the lower portion of the sensor switch.
Figure 6:
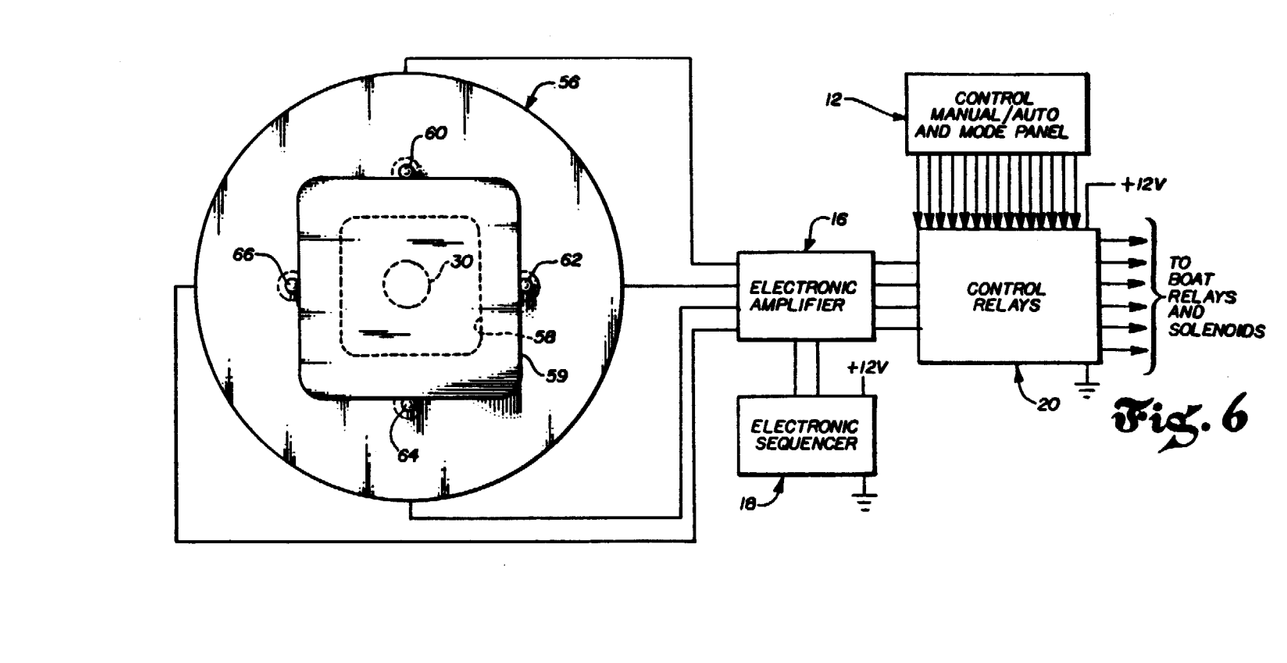
FIG. 6 is a diagram of the parts of the control circuit.

Attached to shaft 30 above the tapered portion 34 and generally below the vertical midpoint thereof are four generally L-shaped vanes 38 with a short or upper dimension 40 thereof extending generally horizontally outwardly from the shaft 30. The vanes then extend vertically downwardly through slots 28 in plate 26 a predetermined distance below plate 26 and terminate above the bottom wall of housing 22. The short or upper arm 40 of the vanes 38 as stated above is secured to the shaft 30. Additional spacing and securing means 42 are disposed between the four vanes and over a portion of the upper part 40 thereof. The main sections of the vanes extend, as described above, downwardly through the radial slots 28 and terminate in lower end 44. A connector plate or disc 46 is disposed on the upper surfaces of the lower ends 44, as can be seen in FIGS. 3 and 5, and a weight such as lead 48 is secured to the connector plate. The point 35 of shaft 30 riding in the cone socket 36 causes shafts 30 to assume a vertical position regardless of the attitude of the housing or container 22. A viscous fluid substance such as oil of desired viscosity is maintained in the lower portion of the housing below plate 26 and ledge 24 so as to slow down the reaction time of the balancing mechanism as a boat rolls and tosses on the water. Plate 26 and the receiving cavity may be made of metal or plastic. Shaft 30 may be made preferably of nylon impregnated plastic although it can also be made of metal. The vanes 38 are also preferably made of plastic but may also be made of metal. The spacer or connector plate 46 at the bottom may be plastic as may be the upper spacers 42 between the upper portions 40 of the vanes.

The upper inside end of container or housing 22 includes an upper ledge 50 and a lower ledge 52 spaced a predetermined distance below. It will be noted that support ledge 50 is approximately at the upper end of the container or housing 22 while the lower ledge 52 is spaced a given distance below. An upper circuit board 54 is supported on ledge 50 and a lower circuit board 56 is supported on ledge 52. It will be noted that circuit board 56 is provided with an opening 58 generally centrally thereof through which extends the upper end of shaft 30. Shaft 30 at its upper end is provided with a generally rectangular target plate 59 which is located on the shaft generally midway between circuit boards 54 and 56.

Figure 8:
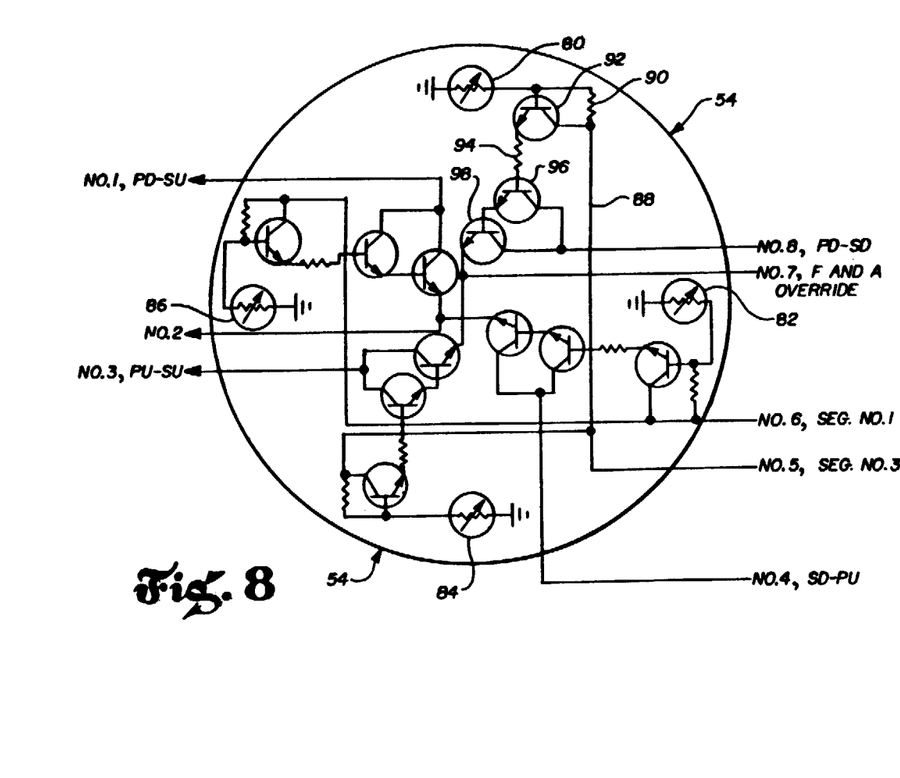
FIGS. 8 and 9 show details of the circuit boards in the upper portion of the sensor switch.

Circuit board 56, best shown in FIG. 8, has four light emitting diodes 60, 64, 64 and 66 each of which is connected to the 12-volt support via line 68. A line 70 with resistance 72 connects the diodes to the ground common 74.

Figure 9:
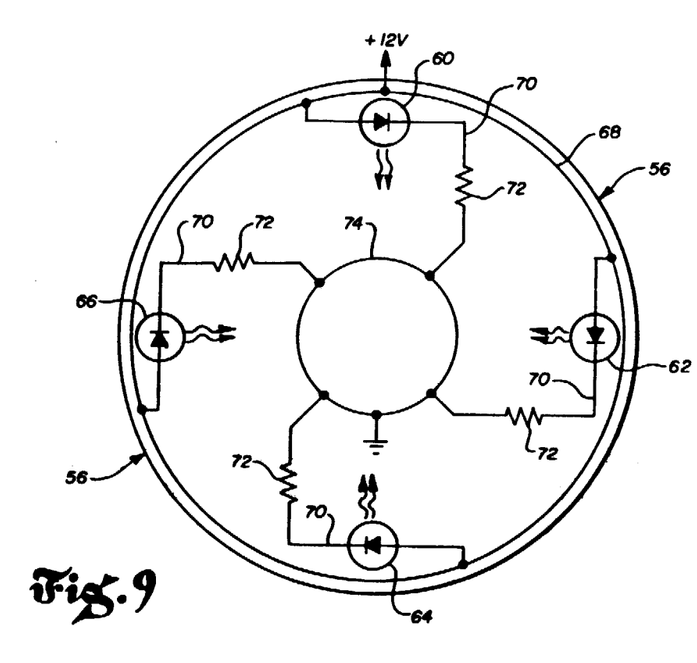

The upper circuit board 54 carries the photocells 80, 82, 84 and 86 such that when the housing 22 is in an acceptable attitude as mounted in the vessel, light beams from the four equally spaced light emitting diodes 60, 62, 64 and 66 remain unbroken and no corrections occur in the trim tabs. When a list or off plane condition occurs the sensor container or housing 22 is tilted with respect to target plate 59. Plate 59 is maintained in its position by the vertical shaft 30. Tipping of the housing 22 and thus the circuit boards 54 and 56, upon a predetermined amount of movement, will move the alignment of the light beams with respect to target plate 59 and thus break one or more of the light paths between LED's 60 etc. and photocells 80, etc. Each of the photocells, 80, 82, 84 and 86 are essentially connected the same way in the circuit so that only one photocell circuit will be described.

A power line 88 is connected to the photocell via a bias resistor 90 and is also connected to the base of transistor 92. The collector of the transistor is connected to the power side of resistor 90 and the emitter is connected to an isolation or coupling resistor 94 in turn connected to the base of the first of two transistors in a darlington pair, namely transistors 96 and 98. In this manner, when the light beam to photocell 80, for example to signal a list or planing condition needing correction, is broken, the resistance in the photocell increases so that the transistor 92 conducts and the signal is transmitted by way of the darlington amplifier to the relay banks.

It will be appreciated that the LED's and photocells sense either starboard or port list and either bow or stern undesirable attitude which must be corrected. As stated above, when the light transmission is broken, the impulse from that circuit will activate the corresponding relay in the relay bank 20. Normally a down trim tab circuit will activate since the relay bank has been wired for a priority down movement. If the down travel of the particular tab has reached its maximum, a cancel relay will transfer the signal to an up travel of the opposite tab for the period of time that the sequencer is programmed to enable it to operate. It is desirable to place the sensor switch on the keel line as near the transom as possible or at least within 1/10th of the boat length of the transom. It is preferable that the sensor switch be near the stern or at the control console.

Figure 10:
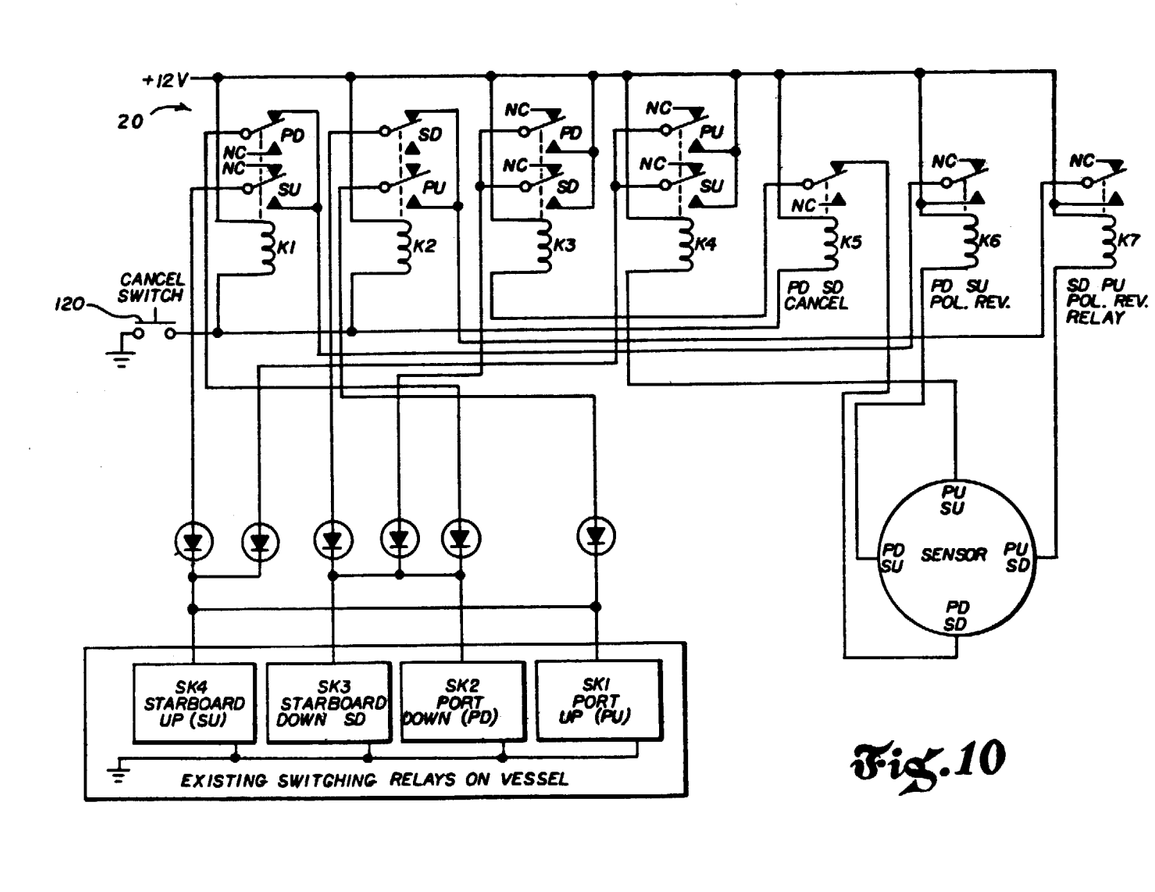
FIG. 10 is a schematic of additional details of the switching relays for trim tab actuation.

By reference to FIG. 10, it will be seen that the relay bank is comprised of seven relays. Relay K1 is for port down and starboard up; relay K2 is for starboard down and port up; relay K3 is for both port and starboard tabs down; relay K4 is for both port and starboard tabs up; relay K5 is a signal cancel relay; relay K6 is for a port down and starboard up polarity reverser from a minus to a plus signal. Relay K7 is for the starboard down, port up and also a polarity reverser. Block diagram references to the relay bank, generally designated by the number 20, are also seen in FIG. 1.

Figure 7:
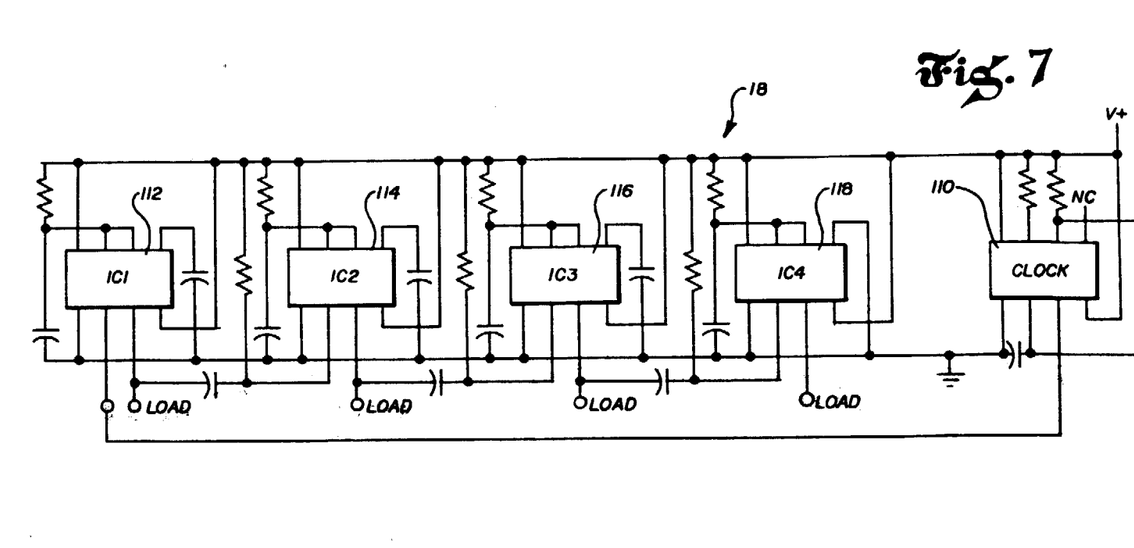
FIG. 7 is a schematic of the sequencing timer circuit portion of the control system.

Sequencer 18, best seen in FIG. 7, times the period in which port/starboard and fore/aft corrections in the trim tab seeing may be made. For instance, clock 110 may be set to institute a timing cycle of, for example, 12 or 16 second intervals though this may vary. Thus, the clock would activate integrated circuit IC-1 for a period of four seconds with IC-1 connected to the amplifier to enable port/starboard corrections to be directed to the relays. After the time period for IC-1 has expired, a nonconducting or dead period of four seconds will be accounted for by IC-2 before IC-3 is activated to enable fore and aft corrections to be directed to the trim tab relay banks. IC-4 represents another timed dead period before the sequencer is recycled by the clock. The time intervals which obviously could be more or less than the four second increments described allow corrections to be made for the set period of time in one attitude of the vessel. If additional trim tab correction is needed, then the sequencer will enable the controls to make additional corrections again first for the port/starboard list and then after a four second delay to make any fore/aft planing corrections.

To prevent interfrence of fore/aft corrections with port/starboard attitudes of the vessel, the relay bank 20 engages both the port and the starboard trim tabs for simultaneous movement in either an up or down direction, thereby allowing a correction of the fore/aft planing attitude of the vessel without modifying the port/starboard attitude. If at the time a signal is sent for correction, and either a port or starboard trim tab is in a maximum down position, the entire signal will be cancelled permitting no movement of either tab. This is accomplished by means of cancel or pressure switch 120 which is installed in the pressure or output side of the existing hydraulic pump on the trim tab unit vessel.

The circuitry is designed so that the port/starboard correction has priority over the fore/aft correction in the travel of the trim tabs. The operation of the relay bank is wired for a priority down travel of the trim tabs. However, the signal will go an up travel circuit of the opposite trim tab if there is a need for port/starboard correction. However, if down travel is needed for a fore/aft correction, and the trim tab which is to go down is already at full down, then the impulse will be cancelled and no further correction made. The diodes between the relay bank, shown in FIG. 10, and the existing switching relays on the vessel guard against voltages of the wrong polarity being signalled to the switching relays and prevent the manually operated voltage from damaging the automatic system.

Figure 2:
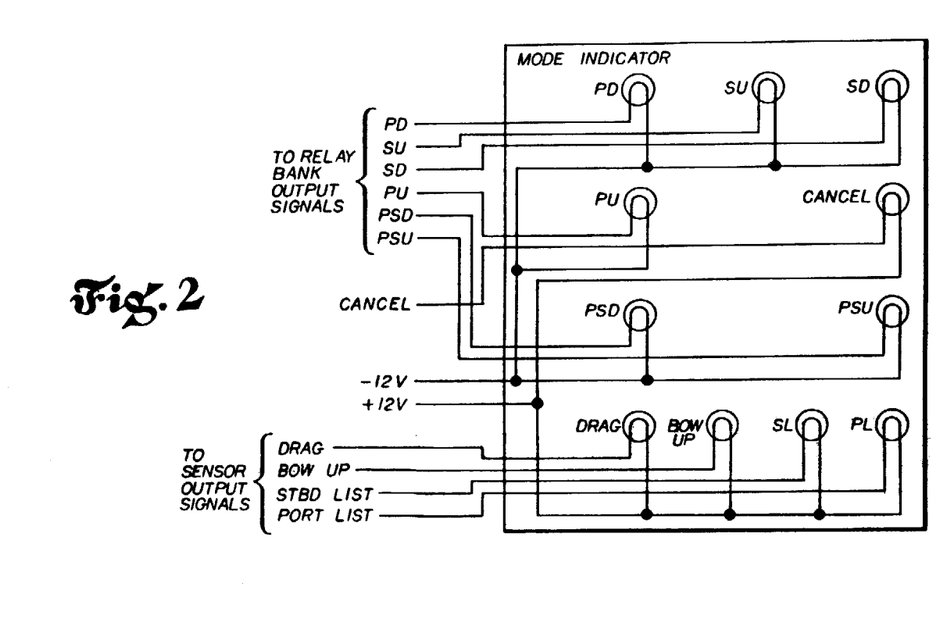
FIG. 2 is a simple circuit for lighting the various indicia on the control panel shown in FIG. 1.

In FIGS. 1 and 2, it will be seen that the control panel 12 includes a forward/aft override switch enabling the boat operator to cancel out forward/aft corrections in the event of heavy water. The control panel shows corrections that are being made but shows the existing conditions of the boat. FIG. 2 is a wiring diagram for the lights for the indicia on the control panel shown in FIG. 1.

Figure 11:
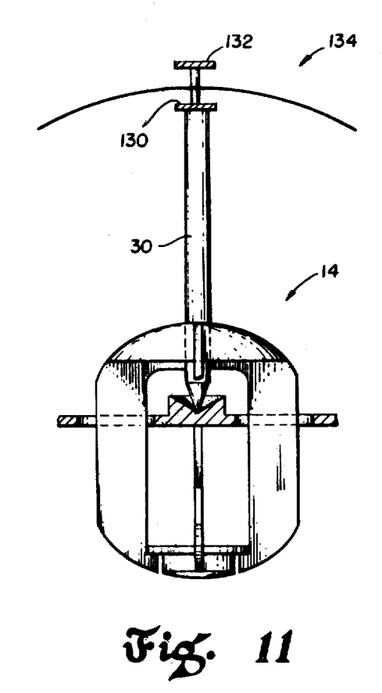
FIG. 11 is a simplified view of the device in which the sensor is utilized for condition detecting in an application other than for boats.
Figure 12:
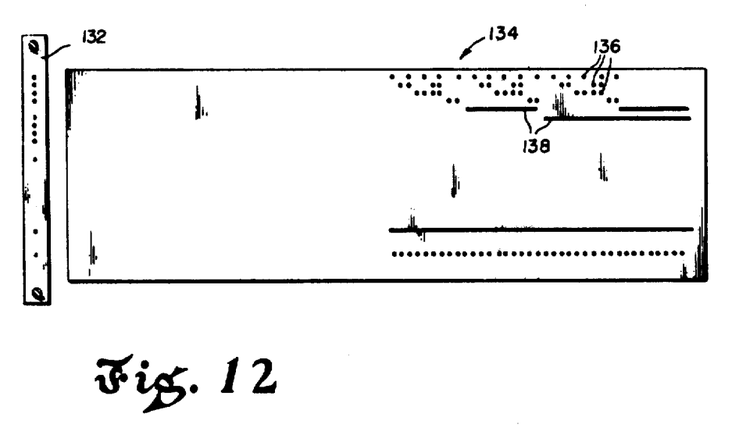
FIG. 12 is a diagrammatic view of a binary coded decimal pattern card for use with the sensor.
Figure 13:
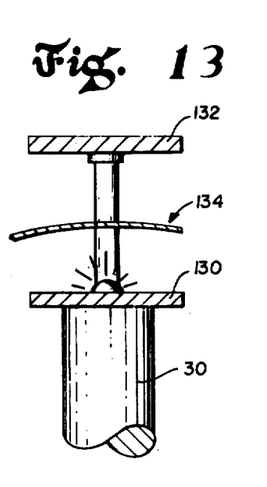
FIG. 13 is a simple diagram further illustrating details of the system and sensor as it could be used for other applications.

With respect to FIGS. 11, 12 and 13, it will be appreciated that many different applications of the sensing device 14 may be made. For instance, the sensor may be used with respect to oil rig drilling platforms or bulldozer blades to name but two applications apart from trim tabs for boats. In short, the invention has utility in any situation in which a surface, platform or device requires an essentially level, horizontal or vertical attitude. Obviously the sensitivity of the device will depend on size. For example, if it is desired to control angular variations to a fraction of a degree a large target plate or card may be necessary with corresponding very close spacing of very small light emitters and receivers.

In the embodiment shown in FIGS. 11-13, the light emitter and light responsive boards 130 and 132 respectively, are attached to and supported at the upper end of balance shaft 30. The target plate or binary coded decimal card 134 is supported by the sensor housing and thus moves with the housing. The light emitting and light responsive means remain generally stationary with the balance shaft assembly. In this way, movement of the housing would move the card and allow a photoelectric circuit to energize and generate a correction signal.

The card 134 shows holes 136 and 138 on one side of center only. It will be understood that the boards 130 and 132 supporting LED's and receives would be at the center of the card 134 and that the pattern of holes 136 and 138 could take any pattern on each side of a center line through the card as can be seen in FIG. 11. The example shown will signal attitude variations in one dimension only.

We claim:
1. A sensing and switching device for responding to the off-horizontal and/or off-vertical condition of a device and for generating correction signals for controls and correction means attached to said device, comprising:
(a) an upstanding housing having side and bottom walls and which is open at its upper end,

(b) a generally horizontally disposed support plate within said housing and spaced below said upper end and above said bottom, said support plate including balance shaft retaining means generally centrally disposed on said support plate, (c) a balance shaft assembly including a substantially vertically disposed balance shaft having an upper end and a lower end which is supported on said retaining means, said balance shaft assembly including balancing weight means at the lower end for holding said balance shaft in said retaining means and including a target plate means at its upper end, (d) light responsive means and light emitting means in said housing for sensing movement of said target plate means relative to said light responsive and light emitting means and such that if said housing is tipped by movement of said device said light responsive means will generate a correction signal.

2. The sensing and switching device of claim 1 and in which said balance shaft is tapered at its lower end and said retaining means is an upwardly facing conical recess.

3. The sensing and switching device according to claim 1 and in which said light responsive means are photo cells and said light emitting means are light emitting diodes.

4. The sensing and switching device of claim 1 and in which light emitting means are supported on a lower board below said target plate and said light responsive means are supported on an upper board.

5. The switching and sensing means of claim 4 and in which said light emitting means are normally actuating said light responsive means which generate a correction signal when a light beam is broken.

6. The sensing and switching mechanism of claim 1 and in which said target plate utilizes a pattern of predetermined holes therein through which there are corresponding light emitting and responsive means for said holes of said target plate.

7. The sensing and switching mechanism of claim 1 and in which said balance shaft is substantially nonrotatable.

8. The sensing and switching mechanism of claim 1 and in which said weight means is supported below said support plate by arm means extending from the lower end of said shaft, around said retaining means and through openings in said support plate and which arm means having the weight means attached thereto at their lower end.

9. A sensing and switching device for responding to the off-horizontal and/or off-vertical condition of a device and for generating correction signals for controls and correction means attached to said device, comprising:

(a) an upstanding housing having side and bottom walls, (b) a generally horizontally disposed support plate within said housing and spaced below said upper end and above said bottom, said support plate including balance shaft retaining means generally centrally disposed on said support plate, (c) a balance shaft assembly including a substantially vertically disposed balance shaft having an upper end and a lower end which is supported on said retaining means, said balance shaft assembly including balancing weight means attached thereto for holding said balance shaft in said retaining means and including light emitting means and light responsive means at its upper end, (d) target plate means supported independently of said light emitting and light responsive means such that movement of said housing will move said target plate with respect to said lightemitting and light responsive means to generate a correction signal.

10. The sensing and switching device of claim 9 and in which said balance shaft is tapered at its lower end and said retaining means is an upwardly facing conical recess.

11. The sensing and switching device according to claim 9 and in which said light responsive means are photo cells and said light emitting means are light emitting diodes and are spaced apart a predetermined distance such that said target plate is disposed between them.

12. The sensing and switching mechanism of claim 9 and in which said weight means is supported below said support plate by arm means extending from the lower end of said shaft, around said retaining means and through openings in said support plate and which arm means having the weight means attached thereto at their lower end.

* * * * *